(12) United States Patent  
Choi

(10) Patent No.: US 6,788,638 B1  
(45) Date of Patent: Sep. 7, 2004

(54) OPTICAL PICKUP ACTUATOR HAVING A MAGNETIC FLUX-CONTROLLING MEMBER

(75) Inventor: In-Ho Choi, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 495 days.

(21) Appl. No.: 09/686,788

(22) Filed: Oct. 12, 2000

(30) Foreign Application Priority Data

Dec. 23, 1999 (KR) ......................................... 1999-61233

(51) Int. Cl.[7] ............................................. G11B 17/00
(52) U.S. Cl. ....................................................... 369/244
(58) Field of Search ........................... 369/244; 359/814

(56) References Cited

U.S. PATENT DOCUMENTS

| | | | | |
|---|---|---|---|---|
| 5,663,841 A | * | 9/1997 | Akiba et al. ................. | 359/814 |
| 5,933,405 A | * | 8/1999 | Song .......................... | 369/244 |
| 6,031,812 A | * | 2/2000 | Liou ........................... | 369/244 |
| 6,034,940 A | * | 3/2000 | Lee ............................. | 369/244 |

FOREIGN PATENT DOCUMENTS

| | | |
|---|---|---|
| JP | 06-020289 | 1/1994 |
| JP | 07-093779 | 4/1995 |
| JP | 07-147021 | 6/1995 |
| JP | 08-263864 | 10/1996 |
| JP | 09-035294 | 2/1997 |
| JP | 11-086307 | 3/1999 |

* cited by examiner

*Primary Examiner*—David Davis
(74) *Attorney, Agent, or Firm*—Birch, Stewart, Kolasch & Birch, LLP

(57) ABSTRACT

Disclosed is an optical pickup actuator capable of regulating quantity of a leakage magnetic flux to minimize a phase change of an objective lens. The optical pickup actuator according to the present invention comprises a moving part having an asymmetric structure with respect to the objective lens, and a driving force of the moving part is generated by a magnetic circuit constituting of permanent magnets, a yoke and coils. In the vicinity of the magnetic circuit, a sub coil portion of the focusing coils and a magnetic flux-controlling member are provided for interlinking with a leakage magnetic flux generated from the magnetic circuit and for controlling quantity of the so generated and interlinking leakage magnetic flux, respectively. In the so constructed optical pickup actuator according to the present invention, the phase change of the objective lens in a rotational vibration mode, particularly in a pitching mode can be minimized by changing the moment of force generated from the side of the coil outside of the effective magnetic field space and influencing the moving part.

4 Claims, 16 Drawing Sheets

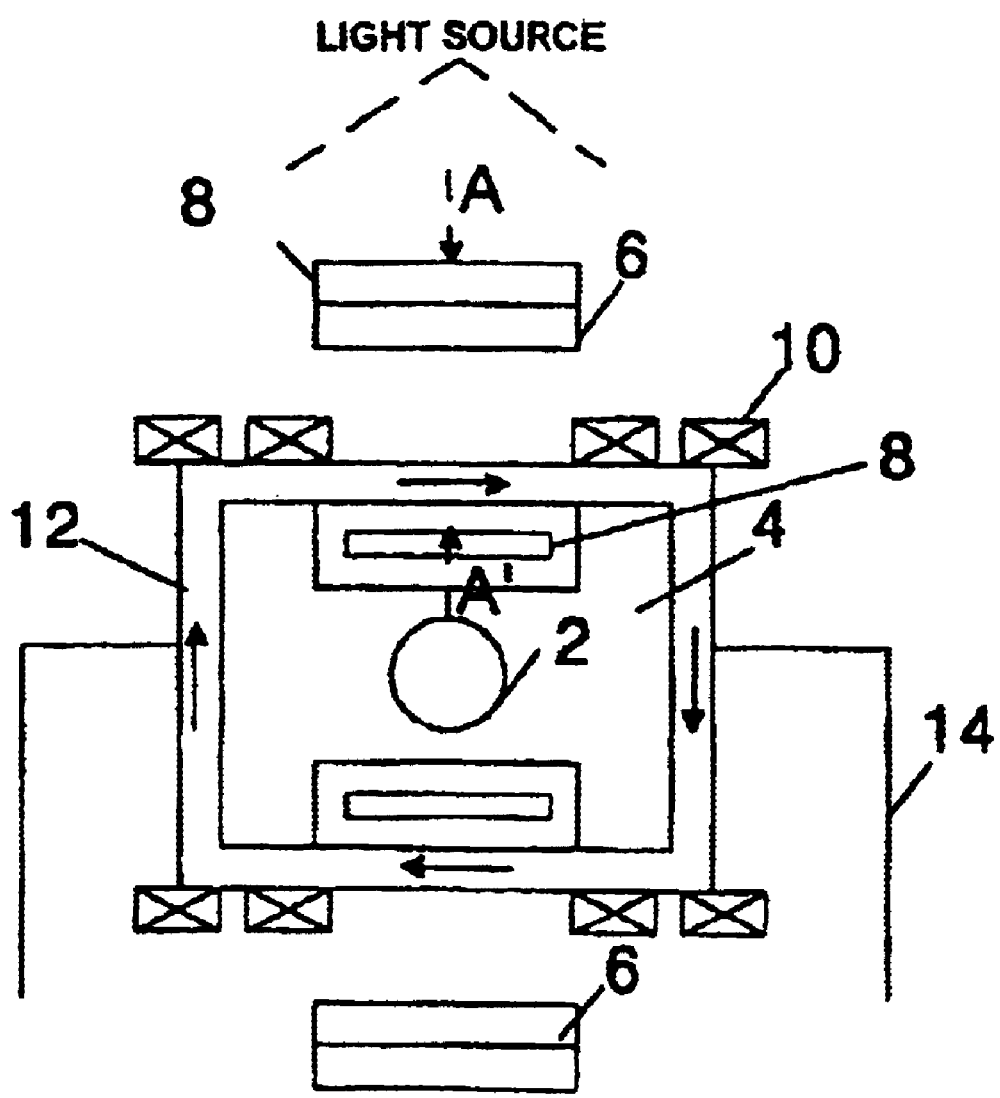

FIG. 7a
(Prior Art)
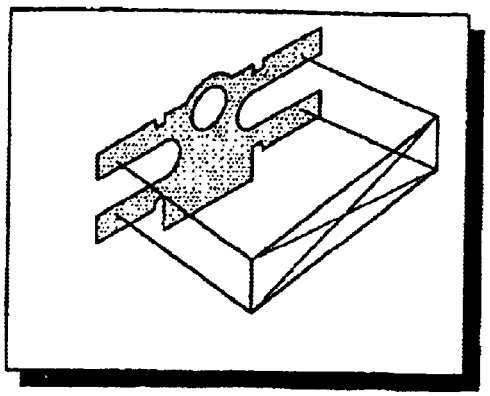
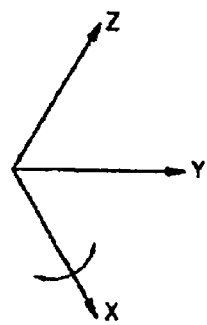
FIG. 7b
(Prior Art)
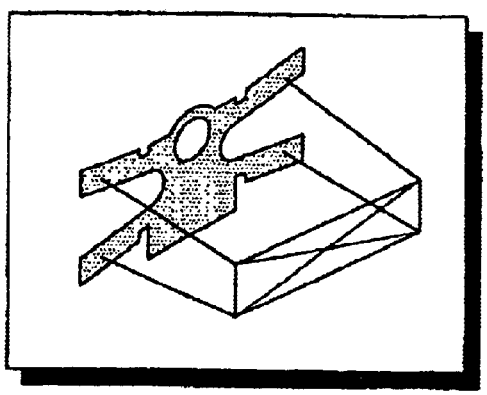
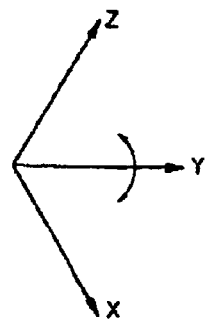

FIG. 7c
(Prior Art)
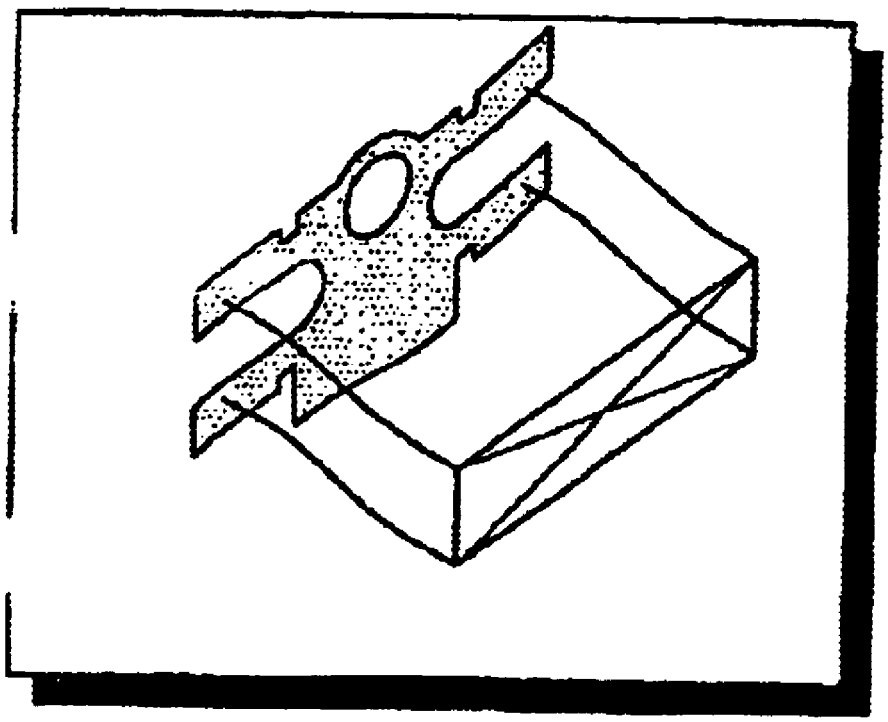
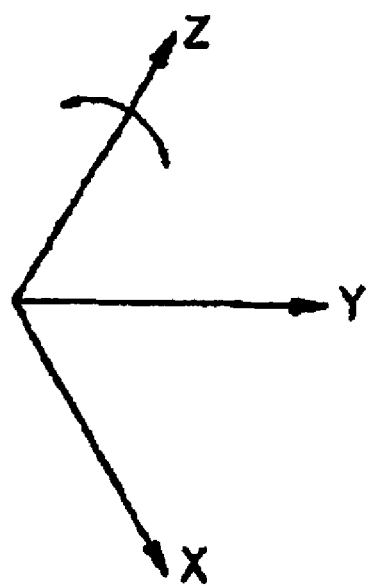

OPTICAL PICKUP ACTUATOR HAVING A MAGNETIC FLUX-CONTROLLING MEMBER

BACKGROUND OF THE INVENTION

1. Field of the Invention

The present invention relates to an optical pickup actuator, and more particularly to an optical pickup actuator suitable for a compact/portable information equipments, such as a notebook computor.

2. Description of the Related Art

Recently, a rapid development of an optical disc has brought a variety of optical pickups for recording information on the optical disc or reproducing information therefrom. The optical pickup is provided with an actuator for tracking control and focusing control, wherein the tracking control is to control a light spot condensed by an objective lens to follow a center of a signal track on the optical disc, and the focusing control is to control the light spot to be focused on a signal track surface. This actuator is driven by a Lorenz force generated in accordance with Fleming's left-hand law by placing a coil within a magnetic field space between a magnet and a magnetic substance.

The optical pickup is tending to be made thinner to keep pace with compact/portable information equipments, such as a notebook computer. The optical pickup actuator can be classified into two types according to a position of the objective lens on a bobbin, i.e. a lens-centering type as shown in FIG. 1 and a lens-protruding type as shown in FIG. 4.

Referring to FIG. 1, a conventional lens-centering type actuator is divide into a moving part including an objective lens 2, a bobbin 4, tracking coils 10, focusing coils 12 and wire springs 14, and a fixed part including permanent magnets 6 and a yoke 8. In the moving portion, the objective lens 2 serves to condense an incident light beam from a light source on an optical disc. The objective lens 2 is fitted into an annular hole formed in a center portion of the bobbin 4. The focusing coils 12 are wound around the whole side surfaces of the bobbin 4, and the tracking coils 10 are adhered to the wound surfaces of the focusing coils 12. The wire springs 14 are connected between printed circuit boards (not shown) disposed at centers of left/right side surfaces of the bobbin 4 and a frame to support elastically the moving part and to supply a current signal from the frame to the tracking coils 10 and the focusing coils 12. In the fixed part, the permanent magnets 6 are adhered to the yoke 8 while confronting the tracking coils 10 and the focusing coils 12 to generate a magnetic flux interlinking with the tracking coils 10 and the focusing coils 12. The yoke 8 is composed of a metallic magnetic substance, outer side portions of which the permanent magnets are adhered to and opposite inner side portions of which are fitted into rectangular holes in the bobbin 4.

With this lens-centering type actuator, as shown in FIG. 2a, the direction of a focusing drive force is determined by the direction of the magnetic flux generated by the permanent magnets 6 and the direction of electric current applied to the focusing coils 12. For example, when the direction of the magnetic flux is a direction of x-axis and the direction of electric current flowing in the focusing coils 12 within a magnetic field space is a direction of z-axis (a direction coming from a land surface), the driving force acts in a direction of y-axis in accordance with Fleming's left-hand law. Similarly, when the direction of the magnetic flux is a direction of—x-axis and the direction of electric current is a direction of z-axis, the driving force acts in a direction of—y-axis. This force acting in the vertical direction drives the objective lens 2 in a direction perpendicular to a recording surface of the optical disc.

As shown in FIG. 2b, the direction of tracking drive force is determined by the direction of the magnetic flux generated by the permanent magnets 6 and the direction of electric current applied to the tracking coils 10. For example, when the direction of the magnetic flux is a direction of z-axis and the direction of electric current is a direction of y-axis, the driving force acts in a direction of x-axis. Similarly, when the direction of the magnetic flux is a direction of z-axis and the direction of electric current is a direction of—y-axis, the driving force acts in a direction of—x-axis. This force acting in the horizontal direction drives the objective lens 2 in a direction horizontal to the recording surface of the optical disc.

However, there is a limitation in making the actuator thin enough in the lens-centering type actuator because a magnetic circuit is constructed on an optical path of the incident light from the light source. In fact, the lens-centering type actuator is accompanied with structural difficulties in constructing the magnetic circuit on the optical path, thus a height $H_{LCA}$ from the objective lens 2 to a 45° reflecting mirror 16 becomes high as shown in FIG. 3.

To solve this problem, a lens-protruding type actuator has been proposed which is constructed as shown in FIGS. 4 and 5. Referring to FIGS. 4 and 5, the lens-protruding type actuator is divided into a moving part including an objective lens 22, a bobbin 24, tracking coils 30, focusing coils 32 and wire springs 34, and a fixed part including permanent magnets 26 and a yoke 28. In the moving part, the bobbin 24 protrudes a semicircle on its one side, and the objective lens 22 is clamped in a center portion of the protruded side of the bobbin 24. The tracking coils 30 and the focusing coils 32 are disposed within the bobbin 24 while confronting the permanent magnets 26. The wire springs 34 are connected between printed circuit boards (not shown) positioned at centers of left/right side surfaces of the bobbin 24 and a frame. In the fixed part, the permanent magnets 26 are adhered to the side surfaces of the yoke 28 while confronting the tracking coils 30 and the focusing coils 32. Both sides of the yoke 28 are fitted into rectangular holes of the bobbin 24 interposing the tracking coils 30 and the focusing coils 32 therebetween.

Since the objective lens 22 protrudes toward a light source, a magnetic circuit of this lens protruding type actuator can be arranged inside the bobbin 24 as to be positioned outside the optical path. Thus, the height $H_{LPA}$ from the objective lens 22 to a 45° reflecting mirror 36 becomes low as shown in FIG. 5.

With this lens-protruding type actuator, the magnetic circuit structure is disposed in a center portion of the bobbin 24 far from the objective lens 22 in order to avoid the optical path, and the moving part has an asymmetric structure with respect to the objective lens 22. This asymmetric structure of the moving part in the lens-protruding type actuator causes an inconsistency that a center of mass $C_{mass}$ does not converge into both centers of tracking/focusing movements TC, FC as shown in FIG. 6. As a result of this, there is a problem in the conventional lens-protruding type actuator that a vibration mode of the wire springs 34 is found in a driving frequency band making the actuator easily excited.

The moving part of the lens-protruding type actuator is vibrated in a rotational vibration mode due to the inconsistency of the center of gravity with the centers of driving movements of the moving part as shown in FIGS. 7a and 7b. FIG. 7a depicts a rolling mode in which the moving part rotates with an angle with respect to a tangential direction (x-axis) of the optical disc. FIG. 7b depicts a pitching mode in which the moving part rotates with an angle with respect to a radial direction (y-axis) of the optical disc. FIG. 7c depicts a yawing mode in which the moving part rotates with an angle with respect to a direction of an optical axis (z-axis) perpendicular to the optical disc. When the moving part is driven along the tracking or focusing direction in these rotational vibration modes, there is a slant movement of the moving part to cause a phase change of the objective lens 22. That is, the lens-protruding type actuator has a problem in that control stability is low. Particularly, the control stability is low in the pitching mode as compared with in any other modes because the objective lens 22 is positioned in the front area of the asymmetrical moving part. In detail, in this lens-protruding type actuator, the focusing coils in the magnetic circuit structure which generates the driving force of the actuator are wound around one side of the yoke 28 in a rear portion of the bobbin 24, and thus comprise a main focusing coil 32a positioned within an effective magnetic field space and a sub focusing coil 32b positioned in the rear portion of the bobbin 24 as seen from FIG. 8a. A magnetic flux 26a coming from the permanent magnet 26 interlinks with the main focusing coil 32a within the magnetic field space to generate a driving force along a focusing direction while a part 26b of the magnetic flux leaks backward the bobbin 24 interlinking with the sub focusing coil 32b. Consequently, the driving force generated from the side of the main focusing coil 32a along the focusing direction and an incidental force generated from the side of the sub focusing coil 32b give rise to a moment to excite the pitching mode of the moving part. When the moving part is excited in the focusing direction as shown in FIG. 8b, the objective lens 22 in the moving part suffers a great phase change in a resonance frequency band of a characteristic frequency response in which the pitching mode occurs. At this time of a phase change in pitching mode, the gain is also changed. Quantity of this phase change can be reduced by changing the position of the center of mass of the moving part. In other words, if a ratio of the magnetic flux influencing the main focusing coil 32a and the leakage magnetic flux influencing the sub focusing coil 32b is adjusted by changing the position of the center of mass of the moving part, the phase change of the objective lens 22 in the pitching mode can be reduced. In this way, a condition where no phase change occur can be realized by adjusting the position of the center of mass of the moving part and thus changing the moment of the moving part. For the purpose of this, the conventional lens-protruding type actuator is provided with a mass balancer for shifting the position of the center of mass toward the centers of tracking/focusing movements. However, there is a limitation of a space for disposing the mass balancer due to the current trend, i.e. thin actuactor, and also may be aroused unbalance of center of mass to grow heavier.

SUMMARY OF THE INVENTION

Accordingly, the present invention has been made to solve the above-mentioned problems occurring in the prior art, and it is an object of the present invention to provide an optical pickup actuator capable of regulating quantity of a leakage magnetic flux to minimize a phase change of an objective lens.

To achieve this object, there is provided an optical pickup actuator comprising:

a moving part having a asymmetric structure with respect to a objective lens; and a fixed part including permanent magnets and a yoke;

wherein a leakage magnetic flux generated from a magnetic circuit constructed by a permanent magnets, a yoke and tracing/focusing coils, interlinking with a sub coil portion of the focusing coils are controlled by a magnetic flux-controlling member.

According to the present invention, a phase change of the objective lens in a rotational vibration mode, particularly, in a pitching mode can be minimized by changing a moment of force generated from coils outside of an effective magnetic field space and influencing the movable part.

The magnetic flux-controlling member is preferably a cap member for covering an opening formed at an upper portion of the yoke. A length of the cap member is determined in accordance with distances between a center of mass and centers of driving movements of the movable part. Preferably, the cap member is formed with holes having a predetermined size.

Alternatively, the magnetic flux-controlling member is the yoke having an opening formed on its sidewall confronting the sub coil portion of the focusing coils.

It is preferred that the sub coil portion of the focusing coils is integrated to a main focusing coil while having a plurality of inclined portions meeting with both end of the main focusing coil at a predetermined tilt angle.

BRIEF DESCRIPTION OF THE DRAWINGS

The above objects, and other features and advantages of the present invention will become more apparent from the following detailed description when taken in conjunction with the drawings, in which:

FIG. 1 is a schematic view of a conventional lens-centering type actuator;

FIGS. 7a to 7c are views for explaining vibration modes of the lens-protruding type actuator in FIG. 4;

DETAILED DESCRIPTION OF PREFERRED EMBODIMENTS

Hereinafter, an optical pickup actuator according to the present invention will be described with reference to FIGS. 9 to 19.

Figure 2A:
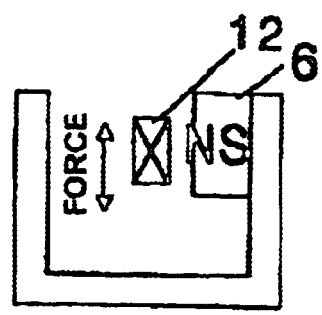
FIG. 2a is a sectional view taken along line A–A' in FIG. 1.
Figure 2B:
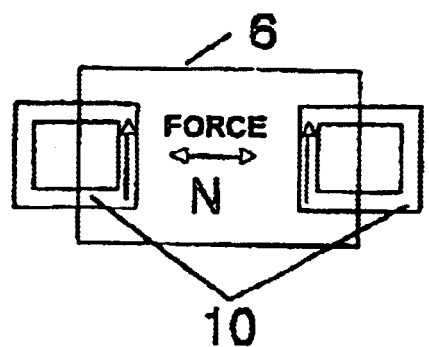
FIG. 2b is a plan view seen from a direction "A" in FIG. 1.
Figure 3:
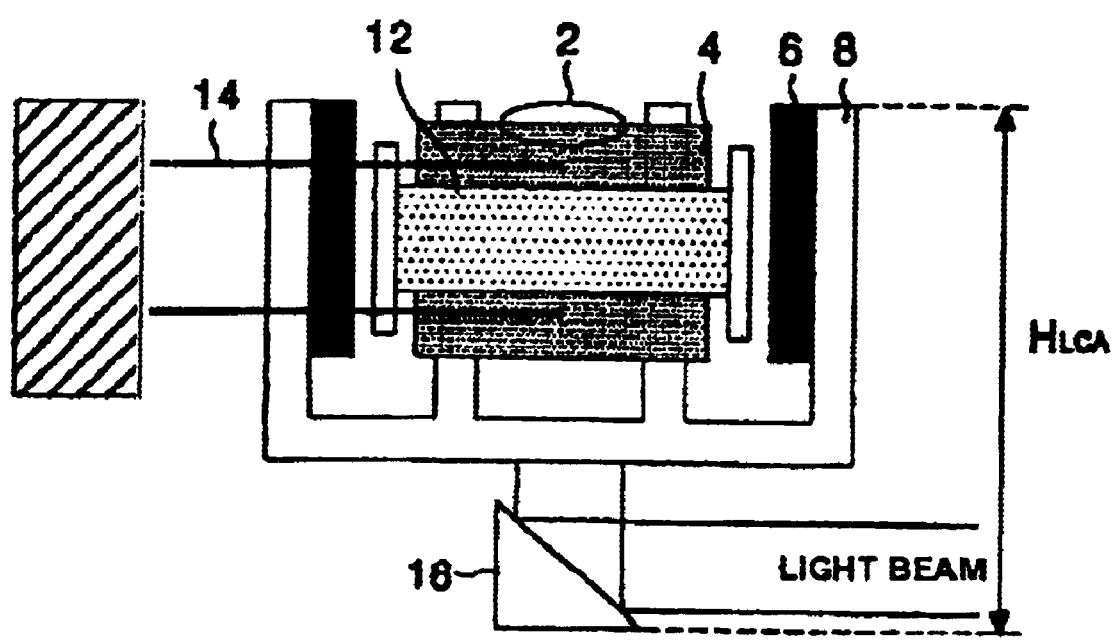
FIG. 3 is a view for explaining a height of the lens-centering type actuator in FIG. 1.
Figure 4:
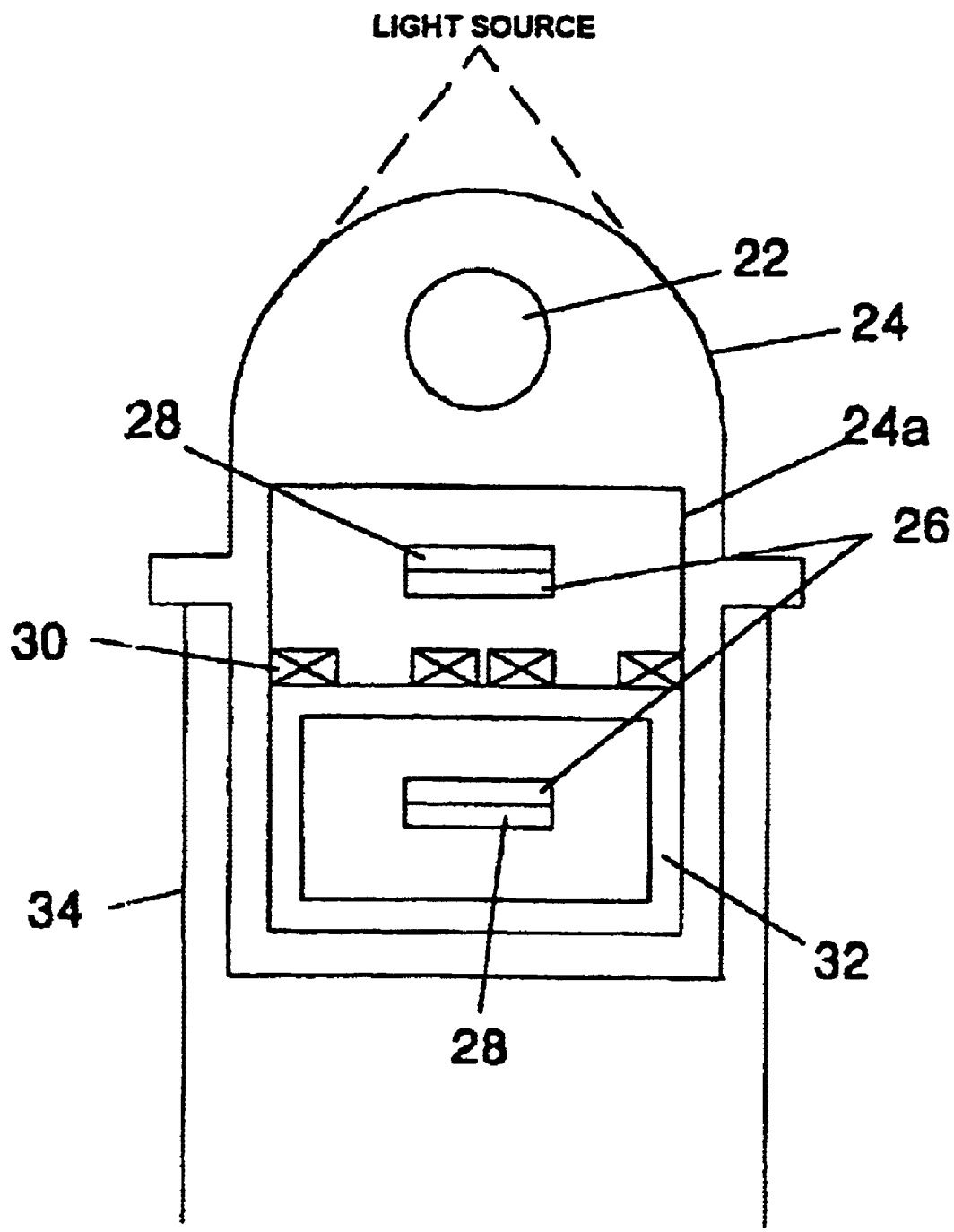
FIG. 4 is a schematic view of a conventional lens-protruding type actuator.
Figure 5:
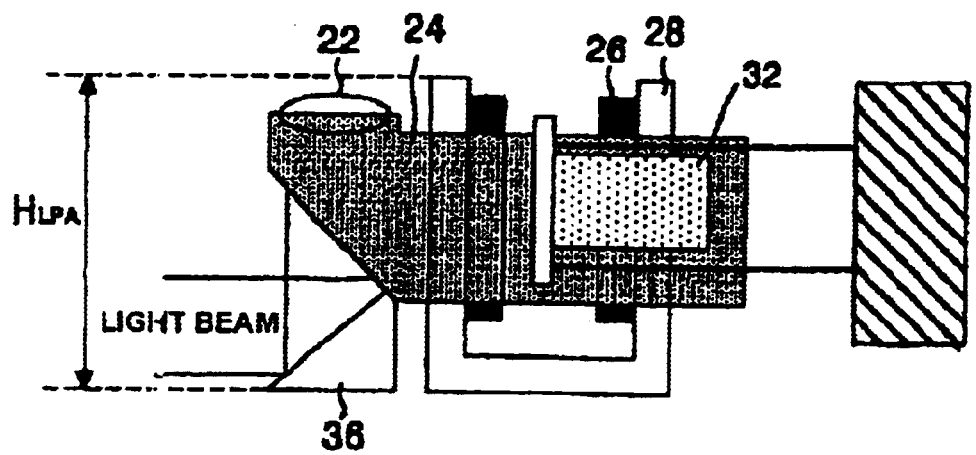
FIG. 5 is a view for explaining a height of the lens-protruding type actuator in FIG. 4.
Figure 6:
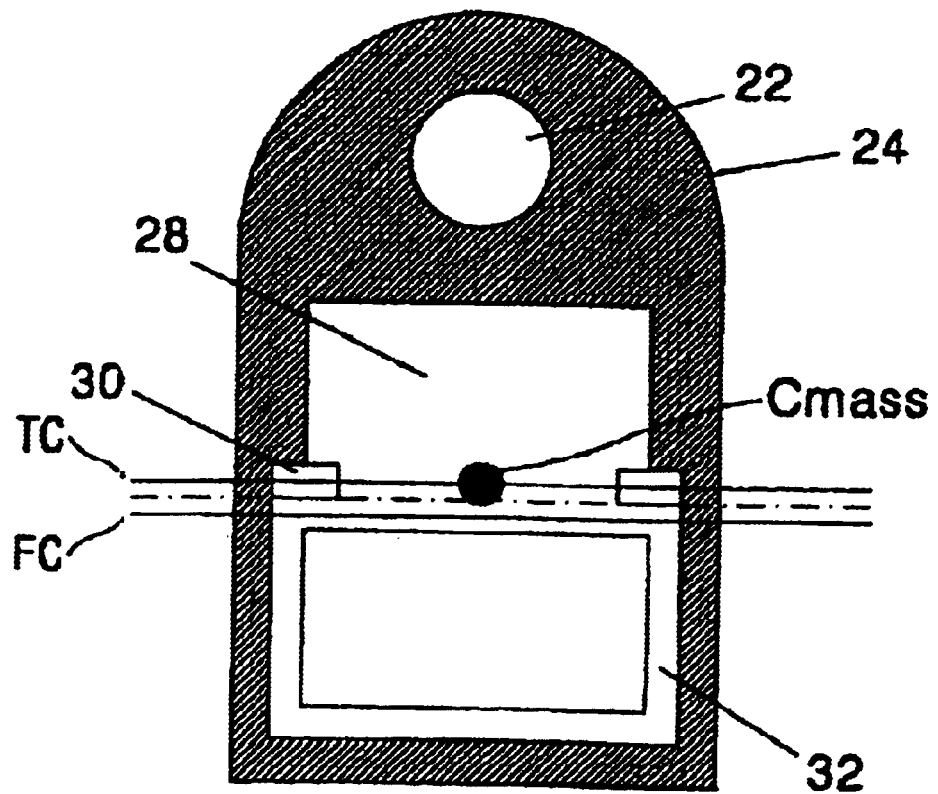
FIG. 6 is a view for showing asymmetric structure of the lens-protruding type actuator in FIG. 4.
Figure 8A:
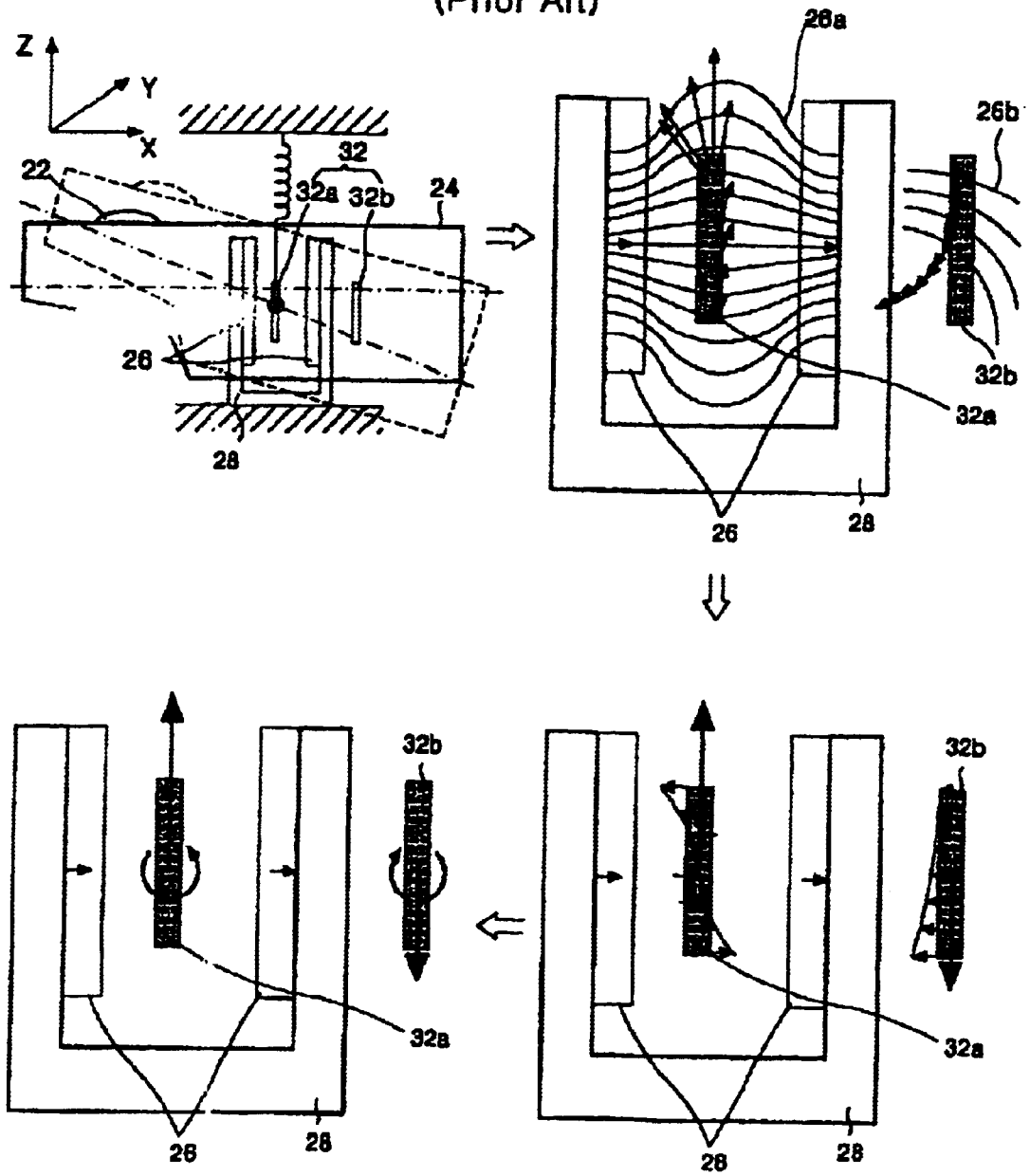
FIG. 8a is a view for explaining excitation applied to a moving part in a pitching mode of the lens-protruding type actuator in FIG. 4.
Figure 8B:
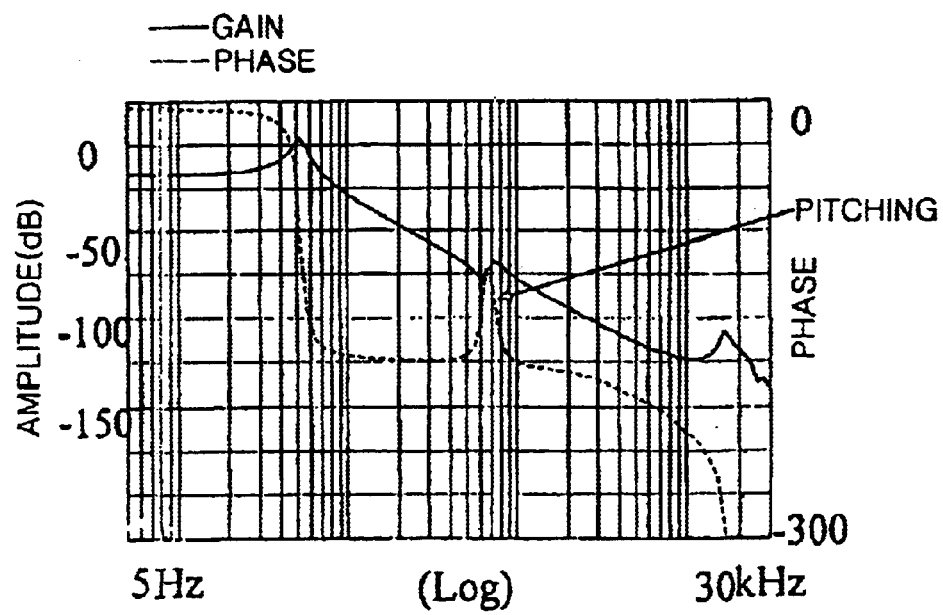
FIG. 8b is a diagram showing a phase change of an objective lens in the pitching mode of the lens-protruding type actuator in FIG. 4.
Figure 9:
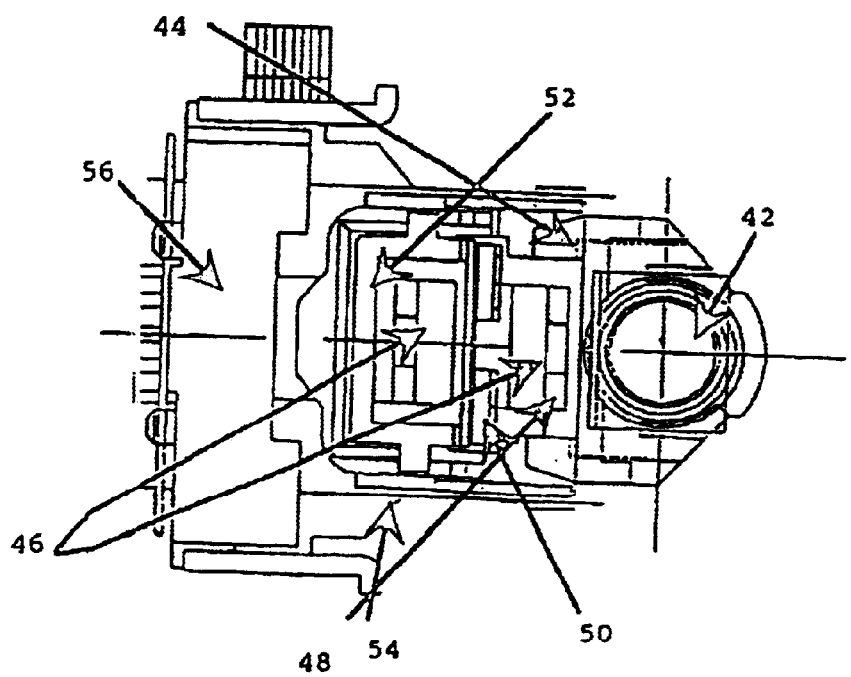
FIG. 9 is a plan view of an optical pickup actuator according to a preferred embodiment of the present invention.
Figure 10:
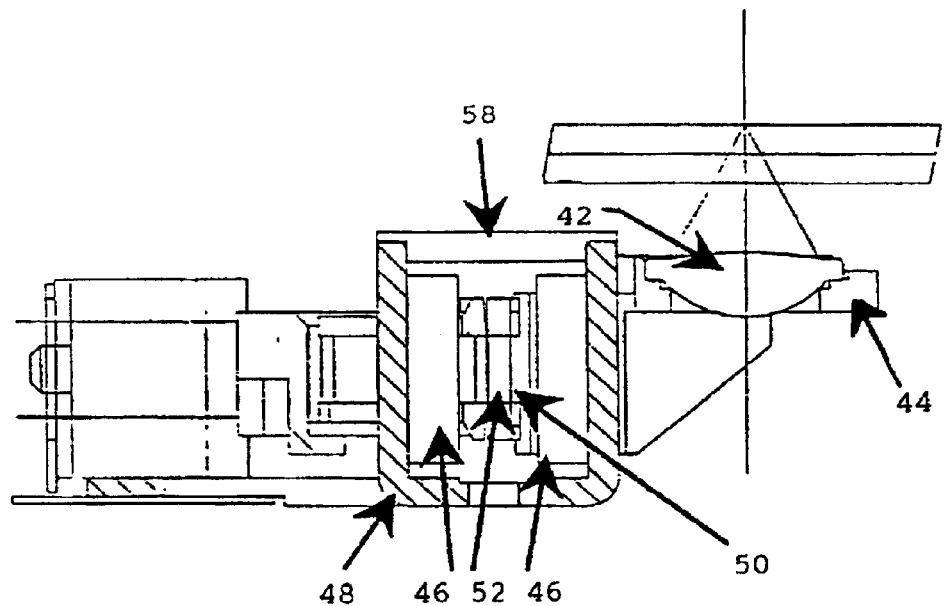
FIG. 10 is a longitudinal sectional view of the optical pickup actuator in FIG. 9.

Referring to FIGS. 9 and 10, the optical pickup actuator according to the present invention having a structure of a lens-protruding type actuator comprises a moving part including an objective lens 42, a bobbin 44, tracking coils 50, focusing coils 52 and wire springs 54, and a fixed part including permanent magnets 46, a yoke 48, a frame 56 and a cap 58.

In the moving part, the bobbin 44 protrudes a semicircle on its one side, and the objective lens 42 is clamped in a center portion of the protruded side of the bobbin 44. The focusing coils 52 are wound around an inner wall of a rectangular hole formed within the bobbin 44, and the tracking coils 50 are adhered to the focusing coils 52 while being wound around an orthogonal direction to the focusing coils 52. The wire springs 54 are connected between printed circuit boards (not shown) positioned at centers of left/right side surfaces of the bobbin 44 and a frame 56.

Figure 11:
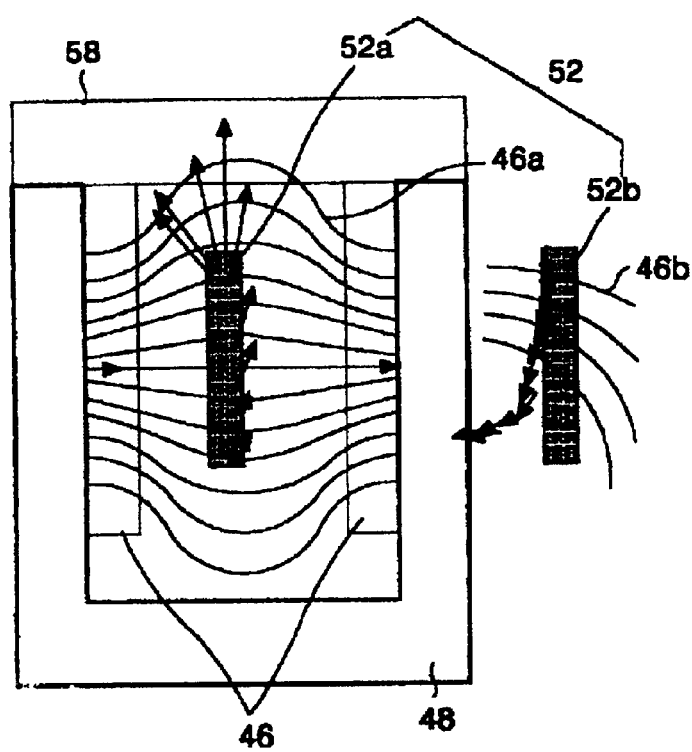
FIG. 11 is a view showing a cap and a magnetic circuit of the optical pickup actuator in FIG. 9.

In the fixed part, the permanent magnets 46 are adhered to the yoke 48 while confronting the tracking coils 50 and the focusing coils 52. As shown in FIG. 11, a magnetic flux 46a generated from the permanent magnets 46 interlinks with the tracking coils 50 and a main focusing coil 52a to generate driving forces along tracking and focusing directions whereas a part 46b of the magnetic flux leaks toward a sub focusing coil 52b. The yoke 48 is disposed within the rectangular hole of the bobbin 44 interposing the tracking coils 50 and focusing coils 52 therebetween.

Figure 12:
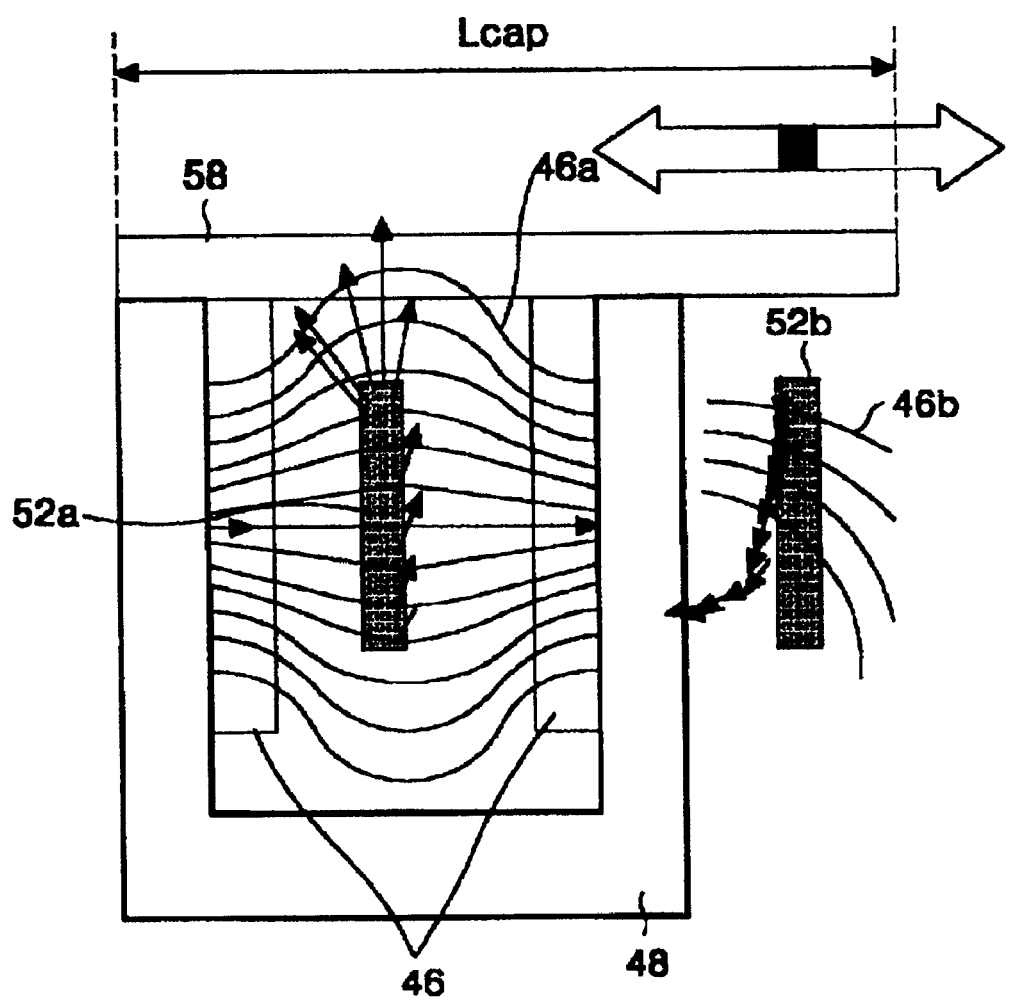
FIG. 12 is a view for explaining a length change of the cap on the magnetic circuit of the optical pickup actuator in FIG. 11.
Figure 13:
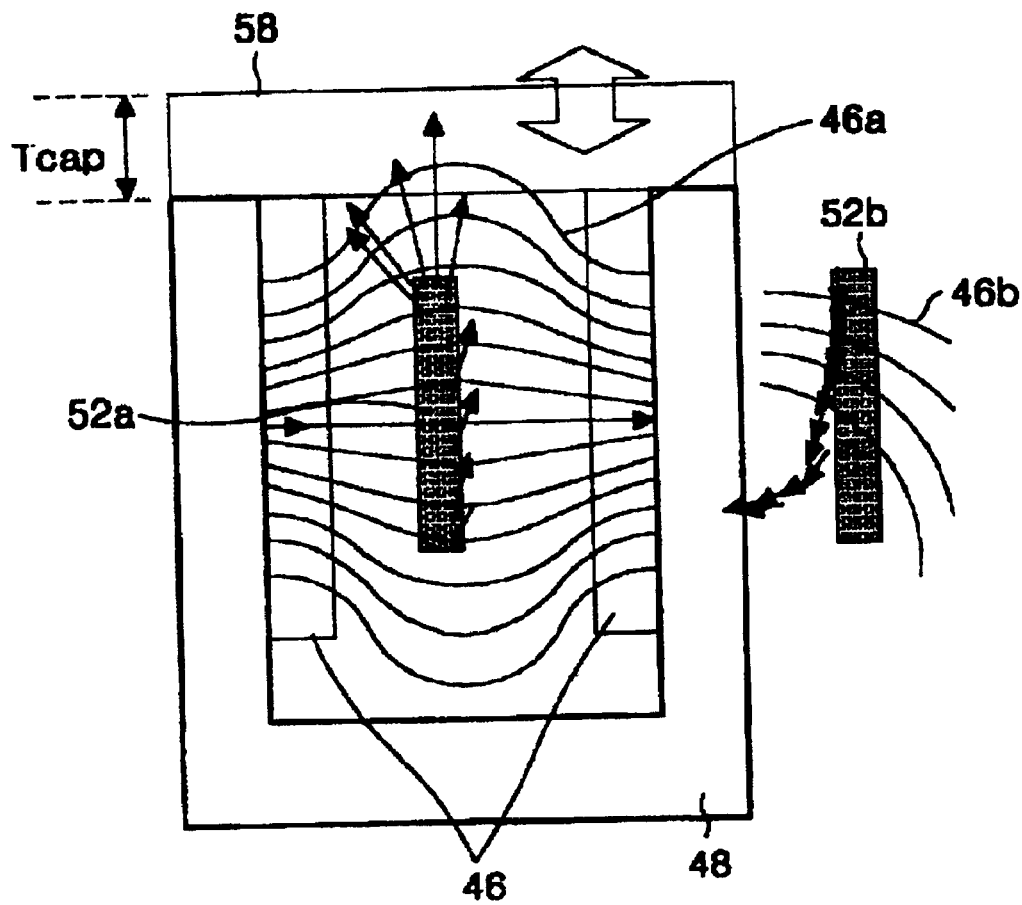
FIG. 13 is a view for explaining a thickness change of the cap on the magnetic circuit of the optical pickup actuator in FIG. 11.
Figure 14:
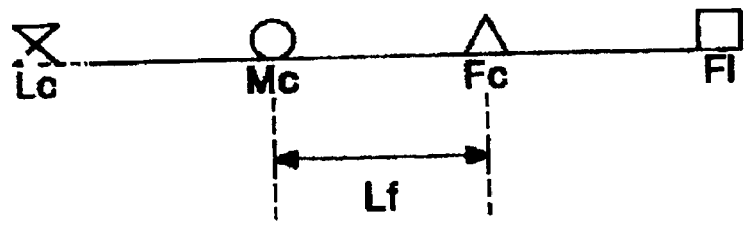
FIG. 14 is a view for explaining a moment relationship of mass of the moving part, a center of driving movement and a force applied to the moving part from a side of a sub focusing coil portion.

As shown in FIG. 11, the cap 58 serves to regulate the leakage of magnetic flux by covering an upper opening of the yoke 48. For the sake of this, the cap 58 is made of a magnetic substance or a permanent magnet of steel series, and its length $L_{cap}$ is adjusted as shown in FIG. 12 or its thickness $T_{cap}$ is adjusted as shown in FIG. 13. When the length $L_{cap}$ of the cap 58 is so long that one side of the cap 58 protrudes over the sub focusing coil 52b, the number of the leakage magnetic flux lines 46b passing through the cap 58 and interlinking with the sub focusing coil 52b among the magnetic flux lines 46a generated from the permanent magnets 46 is decreased. Similarly, the thicker the thickness $T_{cap}$ is, the smaller is the number of the leakage magnetic flux lines 46b interlinking with the sub focusing coil 52b as shown in FIG. 13. At this time, a force generated from the sub focusing coil 52b to change a moment of the moving part becomes weak that much. On the contrary, if the length $L_{cap}$ of the cap 58 grows shorter, the number of the leakage magnetic flux lines 46b passing through the cap 58 and interlinking with the sub focusing coil 52b among the magnetic flux lines 46a generated from the permanent magnets 46 is increased. Similarly, the thinner the thickness $T_{cap}$ is, the greater is the number of the leakage magnetic flux lines 46b interlinking with the sub focusing coil 52b. At this time, a force generated from the sub focusing coil 52b to change a moment of the moving part is greater that much. This means that the quantity of the leakage magnetic flux is regulated depending on a distance $L_f$ between the center of mass MC of the moving part and the center of focusing movement FC shown in FIG. 14. For example, the quantity of leakage magnetic flux 46b leaking toward the sub focusing coil 52b grows smaller as the distance $L_f$ between the center of mass MC and the center of focusing movement FC of the moving part is decreased, and the leakage magnetic flux 46b finally vanishes when the center of mass MC of the moving part falls on the center of focusing movement FC of the moving part. Conversely, the quantity of leakage magnetic flux 46b leaking toward the sub focusing coil 52b grows greater as the distance $L_f$ between the center of mass MC of the moving part and the center of focusing movement FC is increased. In conclusion, the phase change of the objective lens 42 can be minimized when the moment of force is generated from the side of the sub focusing coil 52b to influence the moving part, and the quantity of the leakage magnetic flux 46b interlinking with the sub focusing coil 52b is regulated in such a manner that the moment of force applied to the moving part from the side of the sub focusing coil 52b has no difference in phase from a basic movement, i.e., a translation movement of the moving part in the focusing direction.

Figure 15A:
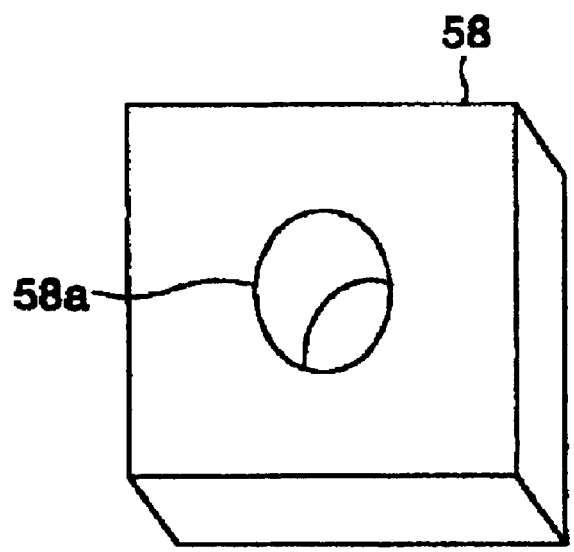
FIGS. 15a and 15b are views showing holes formed through the cap in FIG. 11.
Figure 15B:
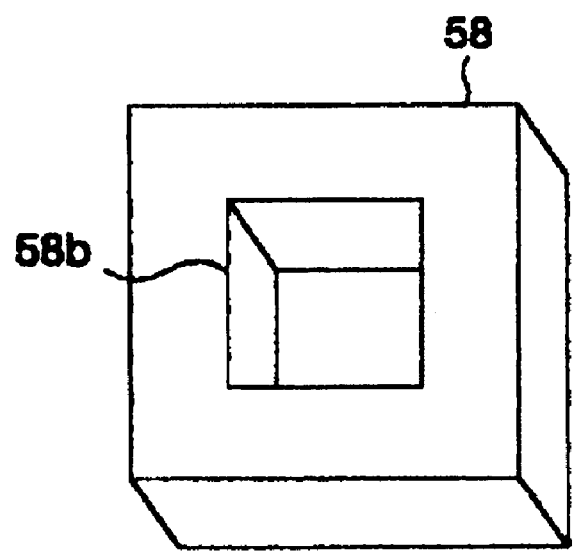

The cap 58 can be formed with a hole 58a or 58b in order to increase the quantity of the leakage magnetic flux 46b interlinking with the sub focusing coil 52b as shown in FIG. 15a or FIG. 15b. The hole 58a or 58b has a shape of a circle as in FIG. 15a, a square as in FIG. 15b or any other polygon, such as an ellipse, a triangle or a pentagon. The larger a size of the hole 58a or 58b is, the greater is the quantity of the leakage magnetic field leaking toward the sub focusing coil 52b. Contrarily, the smaller the size of the hole 58a or 58b is, the less is the quantity of the leakage magnetic field leaking toward the sub focusing coil 52b.

The leakage magnetic flux 46b influencing the sub-focusing coil 52b can be also regulated by means of structural changes of the yoke 68 or the focusing coils 52 as described below.

Figure 16:
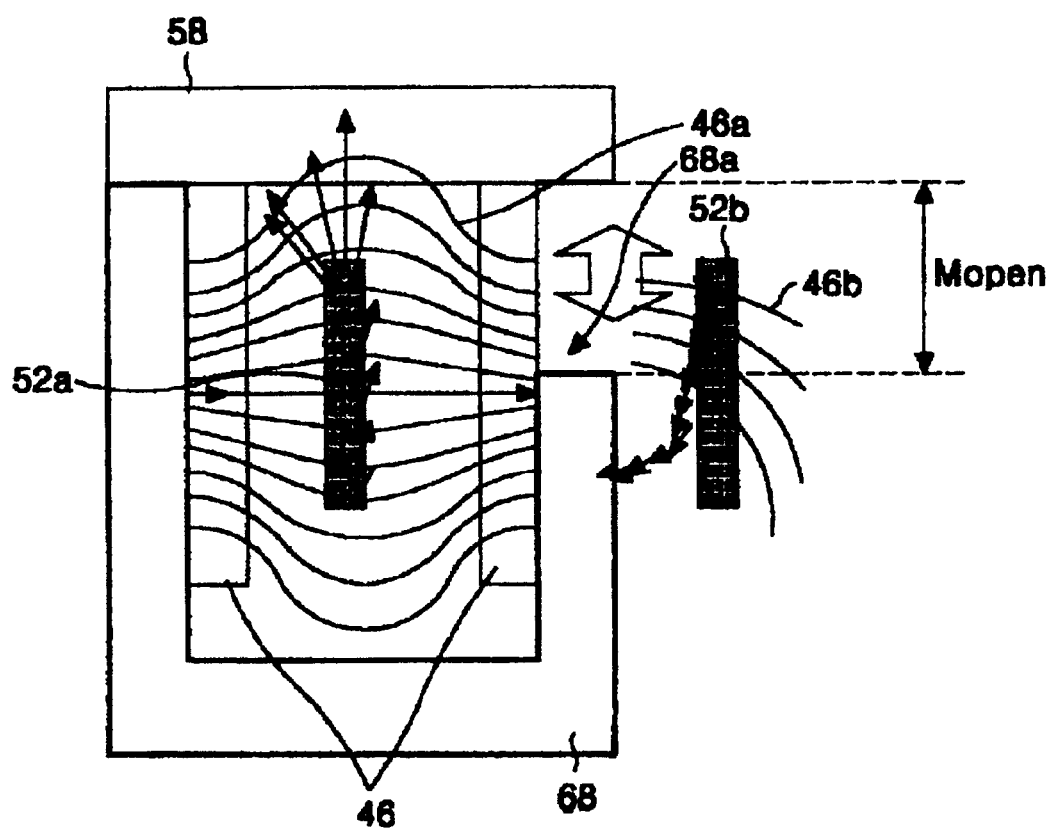
FIG. 16 is a view showing a preferred embodiment of a yoke of the optical pickup actuator according to the present invention.
Figure 17A:
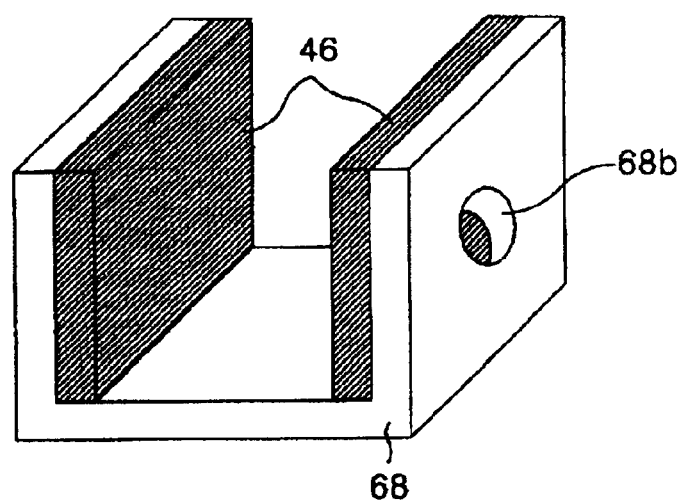
FIGS. 17a and 17b are views showing holes formed through the yoke in FIG. 16.
Figure 17B:
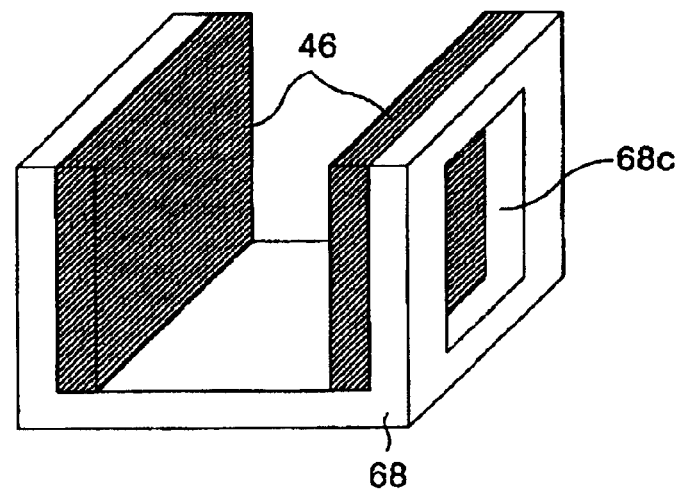

FIGS. 16 and 17 show that the yoke 68 is partially cut out in a portion confronting sub focusing coil 52b or has a hole formed in the confronting portion in order to increase the quantity of the leakage magnetic flux 46b interlinking with the sub focusing coil 52b. As shown in FIG. 16, the leakage magnetic flux 42b generated from the permanent magnets 46 leaks largely toward the sub focusing coil 52b when an upper portion of the yoke 68 confronting the sub focusing coil 52b is cut out to form an opening 68a. In addition, the quantity of the leakage magnetic flux 46b grows greater as a size $M_{open}$ of the opening is increased.

The quantity of the leakage magnetic flux 46b is greater if a sidewall of the yoke 68 confronting the sub focusing coil 52b is formed with a circular hole 68b, a square hole 68c, an elliptic hole or any other polygonal hole. In this case, the larger a size of the hole 68b or 68c, the greater the quantity of the leakage magnetic flux 46b, and vice versa.

Figure 18:
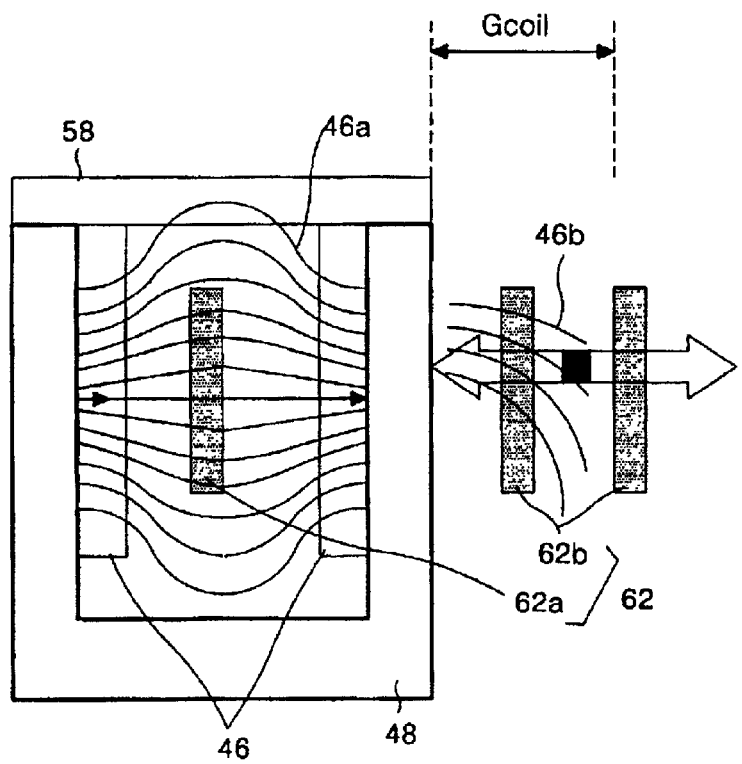
FIG. 18 is a view showing a preferred embodiment of a focusing coil of the optical pickup actuator according to the present invention.
Figure 19:
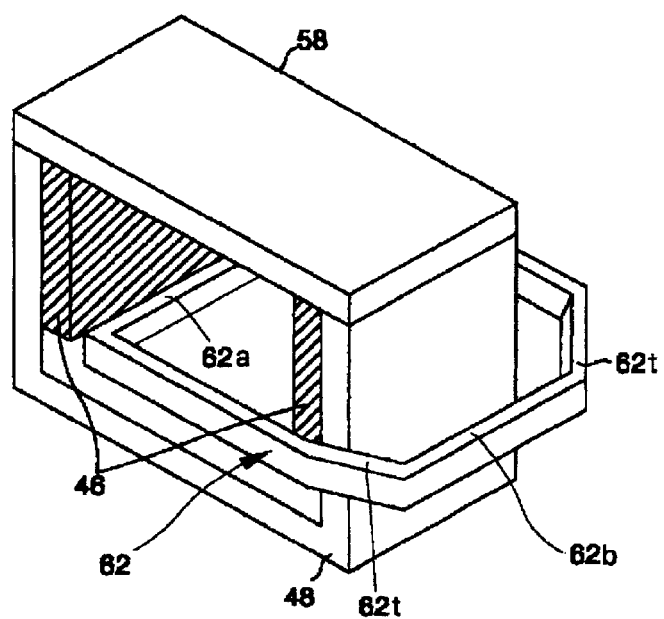
FIG. 19 is a perspective view of the focusing coil and the magnetic circuit in FIG. 18.

FIGS. 18 and 19 show the focusing coils 62 in which the sub focusing coil 62b is so wound as to be far away from the permanent magnets 46 and the yoke 48. Corner portions 62t of a wound surface of the sub focusing coil 62b in the focusing coils 62 meet with a middle portion at a non-right angle, i.e., a slow tilt angle. In other words, the middle portion of the sub-focusing coil 62b in the focusing coils 62 becomes more distant from the permanent magnets 46 and the yoke 48. That is, a distance $G_{coil}$ between the so wound sub focusing coil 62b and the yoke 48 is larger. Then, the quantity of the leakage magnetic flux 46b generated from the permanent magnets 46 and interlinking with the sub focusing coil 62b is decreased as much as increase of the distance $G_{coil}$ between the sub focusing coil 62b and the yoke 48.

As described above, the optical pickup actuator regulates the quantity of the leakage magnetic flux interlinking with the coil not positioned within the effective magnetic field space, but positioned outside of the effective magnetic field space by means of the structural addition or change of the cap, the yoke or the coil. Thus, the phase change of the objective lens in the rotational vibration mode, particularly in the pitching mode can be minimized by changing the moment of force generated from the side of the coil outside of the effective magnetic field space and influencing the moving part. That is to say, the optical pickup actuator according to the present invention has an advantage that the quantity of the leakage magnetic flux generated additionally in the magnetic circuit part can be so regulated with respect as to the physically-generated vibration to adjust the moment of force suitably to the vibration characteristic when the moving part has the asymmetric structure, thereby minimizing the phase change of the objective lens. Further, the optical pickup actuator according to the present invention can control the leakage magnetic flux to prevent a secondary resonance due to the leakage magnetic flux, and can avoid an increase in mass due to the mass balancer provided separately on the moving part for correcting the center of mass, which leads to a high-speed driving. Furthermore, since the separate mass balancer is not needed, a driving characteristic of the actuator can be enhanced without the reduction of a main driving force. Moreover, not only the optical pickup actuator, but also the optical pickup can be slimmed because the optical pickup actuator according to the present invention does not require any additional parts for controlling the quantity of the leakage magnetic flux.

While the present invention has been illustrated and described under considering a preferred embodiment thereof, it will be understood by those skilled in the art that the present invention is not limited to the specific embodiment, and various changes and modifications and equivalents may be made without departing from the true scope of the present invention. Therefore, the technical scope of the present invention should not be limited to the above-mentioned description, but should be set by the scope of the appended claims.

What is claimed is:

1. An optical pickup actuator, comprising:
   a moving part having an asymmetric structure with respect to an objective lens;
   a fixed part including permanent magnets and a yoke;
   a sub coil portion of focusing coils interlinking with a leakage magnetic flux generated from a magnetic circuit constructed by the permanent magnets, yoke and tracking/focusing coils; and
   a cap member including holes having a predetermined shape for controlling the leakage magnetic flux.

2. The optical pickup actuator as claimed in claim 1, wherein the cap member is made of a magnetic substance or a permanent magnet for covering an opening formed at an upper portion of the yoke.

3. The optical pickup actuator as claimed in claim 1, wherein a length and a height of the cap member are determined by the distance between a center of mass and a center of focusing movement.

4. The optical pickup actuator as claimed in claim 1, wherein the size of the cap member is determined by the leakage magnetic flux generated from the magnetic circuit and interlinking with the sub coil portion of the focusing coils.

* * * * *